United States Patent [19]

Ohmori

[11] Patent Number: 6,160,640
[45] Date of Patent: Dec. 12, 2000

[54] IMAGE SCANNING APPARATUS FOR SCANNING BOTH SIDES OF AN ORIGINAL SHEET WITH A SIMPLE MEMORY STRUCTURE AND AN IMAGE DATA OUTPUTTING APPARATUS FOR SEPARATING IMAGE DATA OF EACH SIDE FROM IMAGE DATA OF BOTH SIDES

[75] Inventor: Masatake Ohmori, Kanagawa, Japan

[73] Assignee: Ricoh Company, Ltd., Tokyo, Japan

[21] Appl. No.: 09/127,175

[22] Filed: Jul. 31, 1998

[30] Foreign Application Priority Data

Aug. 7, 1997 [JP] Japan ................................... 9-224467

[51] Int. Cl.[7] ....................................................... H04N 1/04
[52] U.S. Cl. ......................... 358/474; 358/474; 358/482; 358/496; 382/266; 382/165; 382/270
[58] Field of Search ................................. 358/474, 482, 358/496, 498, 426, 406; 382/266, 165, 270, 271, 162, 167

[56] References Cited

U.S. PATENT DOCUMENTS 5,808,752  9/1998  Naba ........................................ 358/426

FOREIGN PATENT DOCUMENTS

8115692   5/1996  Japan .
9284438  10/1997  Japan .

Primary Examiner—Jerome Grant, II
Assistant Examiner—Negussie Worku
Attorney, Agent, or Firm—Cooper & Dunham LLP

[57] ABSTRACT

An image scanning apparatus efficiently compresses and encodes image data obtained by scanning both sides of an original sheet by using a line memory storing three lines. Image data output from a first scanner and image data output from a second scanner are alternately output from a switching unit on an individual line basis. The line memory stores three consecutive lines of the image data output from the switching unit. The three lines include a current line, an immediately preceding line and a second immediately preceding line immediately preceding the immediately preceding line, the current line including a current pixel being encoded. Reference pixels are extracted from among pixels included in the current line and the second immediately preceding line. A pixel value of the current pixel is encoded by using a predicted pixel value of the current pixel as a parameter so as to output encoded image data corresponding to both sides of the original sheet. The prediction of the pixel value is performed by referring to the reference pixels.

8 Claims, 9 Drawing Sheets

IMAGE SCANNING APPARATUS FOR SCANNING BOTH SIDES OF AN ORIGINAL SHEET WITH A SIMPLE MEMORY STRUCTURE AND AN IMAGE DATA OUTPUTTING APPARATUS FOR SEPARATING IMAGE DATA OF EACH SIDE FROM IMAGE DATA OF BOTH SIDES

BACKGROUND OF THE INVENTION

1. Field of the Invention

The present invention generally relates to an image scanning apparatus and, more particularly, to an image scanning apparatus which scans both sides of an original sheet and outputs image data after encoding. The present invention also relates to an image data outputting apparatus and, more particularly, to an image data outputting apparatus which decodes encoded image data obtained by scanning both sides of an original sheet.

2. Description of the Related Art

In a conventional image scanning apparatus serving as a part of a facsimile apparatus, an image filing apparatus or an image scanner, a scanning operation for one side of an original sheet and a scanning operation for the other side of the original sheet may be concurrently performed. Each scanning operation is performed on a line by line basis, and one line image data of one side and one line image data of the other side are alternately synthesized line by line. The thus-obtained image data (both-sides-synthesized image data) is compressed and encoded by a single encoder, and the encoded image data is output to an external apparatus. The encoded image data is referred to as encoded both-sides-synthesized image data. It should be noted that, in a facsimile apparatus, the encoded both-sides-synthesized image data is output after it is temporarily stored in a memory, or directly output to a remote facsimile apparatus. In a case of an image filing apparatus, the encoded both-sides-synthesized image data is stored in a memory unit such as a hard disc apparatus. In a case of an image scanner, the encoded both-sides-synthesized image data is transferred to an upper-order apparatus such as a personal computer via an interface.

In order to encode the both-sides-synthesized image data, an arithmetic encoding may be used such as the one used in the JBIG (Joint Bi-level Image Coding Experts Group) encoding method which can achieve a high compression ratio. In such a case, since the above-mentioned both-sides-synthesized image data is input to the encoder for encoding, one line image data of one side and one line image data of the other side are alternately input to the encoder on a line after line basis.

The JBIG encoding method uses a group of reference pixels adjacent to a current pixel which is being encoded so as to perform an arithmetic encoding on a result of prediction of the current pixel to be encoded. The group of reference pixels adjacent to the current pixel to be encoded is referred to as a template. As for the reference pixels forming the template, pixels adjacent to the current pixel and located in predetermined positions are selected or extracted from among pixels included in the current line which includes the current pixel, the immediately preceding line and the second immediately preceding line.

If the arithmetic encoding is performed on the current pixel by using reference pixels extracted from the above-mentioned three lines, pixels which are not related to the current pixel are included in the reference pixels. That is, pixels included in the immediately preceding line come from the opposite side of the original sheet and are not related to the current pixel (current line). Accordingly, an accuracy of prediction of a pixel value of the current pixel is decreased, which causes a problem in that a compression ratio is decreased.

In order to solve such a problem, the inventor of the present application suggested a technique in Japanese Patent Application No. 8-115692. In this technique, the reference pixels are extracted from the current line and every other line starting from the current line so as to extract pixels from the same side of the original sheet on which the current pixel is located so that a compression ratio of the image data is prevented from being decreased. It should be noted that the Japanese Patent Application No. 8-115692 was laid open on Oct. 31, 1997 as Japanese Laid-Open Patent Application No. 9-284438 and, thus, this patent application cannot be a prior art.

However, in order to achieve the above-mentioned technique, a line memory which can store five lines is needed since two extra lines must be stored in the line memory. That is, three lines including the current line are required for one side of the original sheet and the extra two lines are required for the other side of the original sheet. This creates another problem in that a capacity of the line memory must be increased as compared to the conventional line memory that generally has a capacity for storing three lines.

The same problem may occur in an image outputting apparatus when the encoded both-sides-synthesized image data is decoded and the decoded image data is output by being separated one side from the other. Specifically, in a case of a facsimile apparatus, the same problem may occur when the received encoded both-sides-synthesized image data is decoded and is recorded on a recording paper on a one-side basis. Additionally, in a case of a filing apparatus, the same problem may occur when the encoded both-sides-synthesized image data stored in a memory unit is decoded and is displayed on a one-side basis.

In the image outputting apparatus which decodes the encoded both-sides-synthesized image data, the same kind of template used in the image scanning apparatus is used so as to decode the encoded both-sides-synthesized image data. Accordingly, a line memory which can store five lines is needed since two extra lines must be stored in the line memory. That is, three lines including the current line are required for one side of the original sheet and the two extra lines are required for the other side of the original sheet. This creates a problem similar to that occurring in the above-mentioned image scanning apparatus in that a capacity of the line memory must be increased as compared to the conventional line memory which generally has a capacity for storing three lines.

SUMMARY OF THE INVENTION

It is a general object of the present invention to provide an improved and useful image scanning apparatus and image outputting apparatus in which the above-mentioned problems are eliminated.

A more specific object of the present invention is to provide an image scanning apparatus which can efficiently compress and encode image data obtained by scanning both sides of an original sheet with a minimized hardware capacity.

Another object of the present invention is to provide an image data outputting apparatus which can efficiently expand and decode encoded image data obtained by scanning both sides of an original sheet with a minimized hardware capacity.

In order to achieve the above-mentioned objects, there is provided according to one aspect of the present invention an image scanning apparatus for outputting encoded image data obtained by scanning a first face of an original sheet and a second face of the original sheet, the second face opposite to the first face, the image scanning apparatus comprising:

a first scanner scanning the first face of the original sheet on an individual line basis;

a second scanner scanning the second face of the original sheet on an individual line basis, a scanning operation of the first scanner and a scanning operation of the second scanner being performed substantially at the same time;

a both-sides synthesizing unit outputting both-sides-synthesized image data by alternately outputting image data of the first scanner and the second scanner on an individual line basis;

a line memory storing three consecutive lines of the both-sides-synthesized image data, the three lines including a current line, an immediately preceding line and a second immediately preceding line immediately preceding the immediately preceding line, the current line including a current pixel being encoded;

a template forming unit extracting reference pixels having a predetermined positional relationship with the current pixel, the reference pixels being extracted from among pixels included in the current line and the second immediately preceding line of the line memory; and an encoder encoding a pixel value of the current pixel by using a result of prediction of the pixel value of the current pixel as a parameter for encoding, an encoding operation being performed in accordance with a predetermined arithmetic encoding method so as to output encoded both-sides-synthesized image data, a prediction of the pixel value of the current pixel being performed by referring to the reference pixels.

According to the above-mentioned invention, the reference pixels included in the current line and second immediately preceding line are used for forming the template. Thereby, the both-sides-synthesized image data can be encoded by using the line memory having a capacity for storing three lines consisting of the current line, the immediately preceding line and the second immediately preceding line.

Generally, a line memory associated with a conventional JBIG encoder or decoder has a capacity for storing three lines. Encoded image data which is encoded by using a template covering three lines must be decoded by using the same template covering three lines. Accordingly, if a decoder is provided with a line memory having a capacity for storing two lines, the image data encoded by using the template covering three lines cannot be decoded. Thus, a line memory having a capacity for storing three lines is generally used with a decoder so that the encoded image data encoded by using the template covering three lines can be decoded. Generally, a line memory is shared by an encoder and a decoder in an image processing apparatus. Thus, in practice, most of image processing apparatuses having both an encoding function and a decoding function are provided with a line memory having a capacity for storing three lines.

Accordingly, a conventional image scanning apparatus, which encodes image data corresponding to one side of the original sheet, generally has a line memory having a capacity for storing three lines. Thus, according to the present invention, the both-sides-synthesized image data can be compressed and encoded by using the line memory used in the conventional image scanning apparatus. That is, the image scanning apparatus which can encode the both-sides-synthesized image data can be achieved without increasing a capacity of a line memory used in the conventional image scanning apparatus.

Additionally, there is provided according to another aspect of the present invention an image scanning apparatus for outputting encoded image data obtained by scanning at least one of a first face of an original sheet and a second face of the original sheet, the second face opposite to the first face, the image scanning apparatus comprising:

a first scanner scanning the first face of the original sheet on an individual line basis;

a second scanner scanning the second face of the original sheet on an individual line basis, a scanning operation of the first scanner and a scanning operation of the second scanner being performed substantially at the same time;

a both-sides synthesizing unit outputting both-sides-synthesized image data by alternately outputting image data of the first scanner and the second scanner on an individual line basis when both sides of the original sheet are scanned, the both-sides synthesizing unit outputting one-side image data by outputting image data which is output from one of the first scanner and the second scanner when only one side of the original sheet is scanned;

a line memory storing three consecutive lines of one of the both-sides-synthesized image data and the one-side image data, the three lines including a current line, an immediately preceding line and a second immediately preceding line immediately preceding the immediately preceding line, the current line including a current pixel being encoded;

a template forming unit extracting reference pixels having a predetermined positional relationship with the current pixel, the reference pixels being extracted from among pixels included in the current line and the second immediately preceding line of the line memory when both sides of the original sheet are scanned, the reference pixels being extracted from among pixels included in the current line and the immediately preceding line of the line memory when only one side of the original sheet is scanned; and an encoder encoding a pixel value of the current pixel by using a result of prediction of the pixel value of the current pixel as a parameter for encoding, an encoding operation being performed in accordance with a predetermined arithmetic encoding method so as to output one of encoded both-sides-synthesized image data and encoded one-side image data, a prediction of the pixel value of the current pixel being performed by referring to the reference pixels.

According to the above-mentioned invention, the reference pixels included in the current line and second immediately preceding line are used for forming the template when the both-sides-synthesized image data is encoded. Thereby, the both-sides-synthesized image data can be encoded by using the line memory having a capacity for storing three lines consisting of the current line, the immediately preceding line and the second immediately preceding line. As mentioned above, the line memory having a capacity for storing three lines is generally used in a conventional image scanning apparatus which encodes image data corresponding to one side of the original sheet. Thus, the both-sides-synthesized image data can be compressed and encoded by using the line memory used in the conventional image scanning apparatus. That is, the image scanning apparatus which can encode the both-sides-synthesized image data can be achieved without increasing a capacity of a line memory used in the conventional image scanning apparatus. On the other hand, when image data to be encoded corresponds to only one side of the original sheet, the reference pixels are extracted from the current line and the immediately preceding line. Thus, the same template covering two lines can be commonly used for encoding the one-side image data and the both-sides-synthesized image data.

Additionally, there is provided according to another aspect of the present invention an image scanning apparatus for outputting encoded image data obtained by scanning a first face of an original sheet and a second face of the original sheet, the second face opposite to the first face, the image scanning apparatus comprising:

- a first scanner scanning the first face of the original sheet on an individual line basis;
- a second scanner scanning the second face of the original sheet on an individual line basis, a scanning operation of the first scanner and a scanning operation of the second scanner being performed substantially at the same time;
- a both-sides synthesizing unit outputting both-sides-synthesized image data by alternately outputting image data of the first scanner and the second scanner on an individual line basis;
- a line memory storing three consecutive lines of the both-sides-synthesized image data, the three lines including a current line, an immediately preceding line and a second immediately preceding line immediately preceding the immediately preceding line, the current line including a current pixel being encoded;
- a template forming unit extracting reference pixels having a predetermined positional relationship with the current pixel, the reference pixels being extracted from among pixels included in the current line and the second immediately preceding line of the line memory; and
- an encoder encoding a pixel value of the current pixel by using a result of prediction of the pixel value of the current pixel as a parameter for encoding, a prediction of the pixel value of the current pixel being performed by referring to the reference pixels, the encoding unit comprising:
- a first encoding parameter storing unit storing first encoding parameters used for encoding the image data output from the first scanner, the first encoding parameters being updated each time an encoding operation for the current line corresponding to the first face of the original sheet is completed;
- a second encoding parameter storing unit storing second encoding parameters used for encoding the image data output from the second scanner, the second encoding parameters being updated each time an encoding operation for the current line corresponding to the second face of the original sheet is completed; and
- an encoder encoding the pixel value of the current pixel in accordance with the first encoding parameters read from the first encoding parameter storing unit, when the current pixel being encoded is included in the image data output from the first scanner, so as to output encoded one-side image data corresponding to the first face of the original sheet, the encoder also encoding the pixel value of the current pixel in accordance with the second encoding parameters read from the second encoding parameter storing unit, when the current pixel being encoded is included in the image data output from the second scanner, so as to output encoded one-side image data corresponding to the second face of the original sheet.

According to the above-mentioned invention, the encoding unit encodes the both-sides-synthesized image data by separating the both-sides-synthesized image data into two sets of one-side image data corresponding to the front face and back face of the original sheet. Thus, scanning operations for both sides of the original sheet can be concurrently performed so as to obtain the both-sides-synthesized image data. That is, there is no need to individually scan each side of the original sheet by different scanning operations. Additionally, the encoded image data output from the encoding unit can be decoded by a conventional decoder.

Additionally, there is provided according to another aspect of the present invention an image data outputting apparatus outputting image data by decoding encoded image data obtained by scanning a first face and a second face of an original sheet, the first face being opposite to the second face, the image data outputting apparatus comprising:

- a decoder decoding a current pixel in accordance with a predetermined arithmetic decoding method so as to output decoded image data as both-sides-synthesized image data on an individual line basis;
- a side separating unit separating the both-sides-synthesized image data output from the decoder into first one-side image data corresponding to the first face of the original sheet and second one-side image data corresponding to the second face of the original sheet on an individual line basis;
- an outputting unit separately outputting the first one-side image data and the second one-side image data;
- a line memory storing three consecutive lines of the both-sides-synthesized image data output from the decoder, the three lines including a current line, an immediately preceding line and a second immediately preceding line immediately preceding the immediately preceding line, the current line including the current pixel being decoded; and
- a template forming unit extracting reference pixels having a predetermined positional relationship with the current pixel, the reference pixel being extracted from among pixels included in the current line and the second immediately preceding line of the line memory,
- wherein the decoder outputs the both-sides-synthesized image data by predicting a pixel value of the current pixel by using the reference pixels and decoding the pixel value of the current pixel by using a predicted pixel value of the current pixel as a parameter for decoding in accordance with a predetermined decoding method.

According to the above-mentioned invention, the both-sides-synthesized image data encoded by the image scanning apparatus according to the present invention can be appropriately decoded while the image data corresponding to the front face of the original sheet and the image data corresponding to the back face of the original sheet are separated from each other.

Other objects, features and advantages of the present invention will become more apparent from the following detailed description when read in conjunction with the accompanying drawings.

DETAILED DESCRIPTION OF THE PREFERRED EMBODIMENTS

Figure 1:
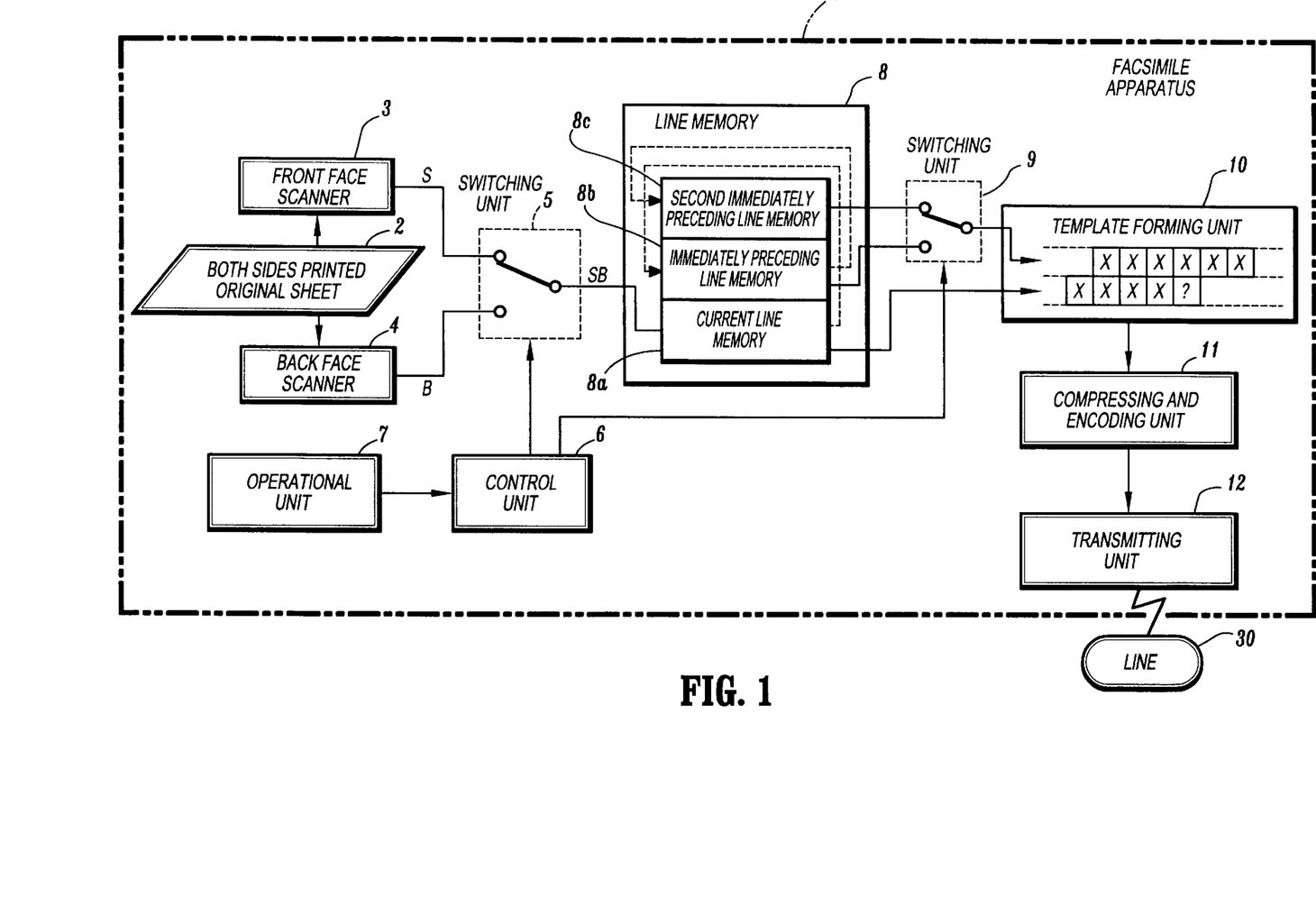
FIG. 1 is a block diagram of a facsimile apparatus according to a first embodiment of the present invention.

A description will now be given, with reference to FIG. 1, of a first embodiment of the present invention. FIG. 1 is a block diagram of a facsimile apparatus according to the first embodiment of the present invention.

Figure 2A:
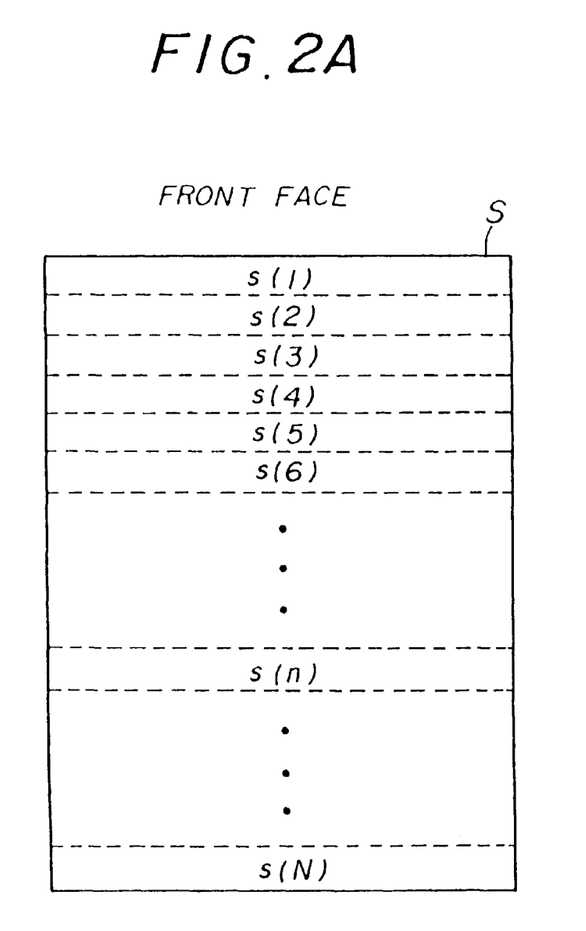
FIG. 2A is an illustration for explaining a structure of image data corresponding to a front face.
Figure 2B:
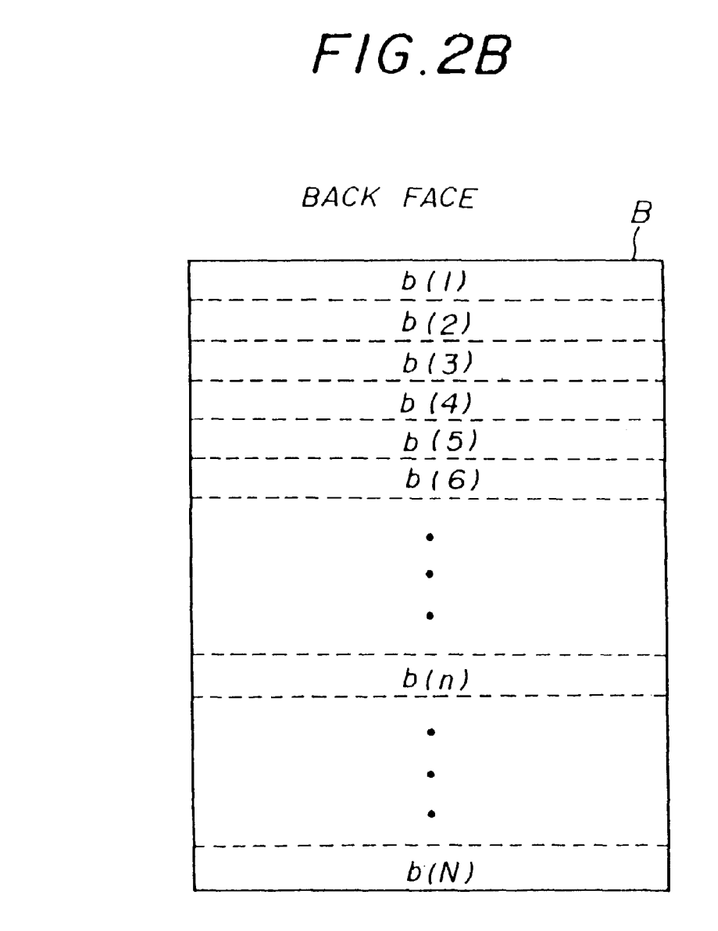
FIG. 2B is an illustration for explaining a structure of image data corresponding to a back face.

In the facsimile apparatus 1 shown in FIG. 1, an original sheet 2 having images to be scanned on both sides is conveyed in a sub-scanning direction by a sub-scanning mechanism (not shown in the figure). A front-face scanner 3 scans a front face of the original sheet 2 in a primary scanning direction, and outputs front-face image data S on an individual line basis. A back-face scanner 4 scans a back face of the original sheet 2 in the primary scanning direction, and outputs back-face image data B on an individual line basis. The front-face image data S comprises, as shown in FIG. 2A, N lines from a line s(1) to a line s(N). Similarly, the back-face image data B comprises, as shown in FIG. 2B, N lines from a line b(1) to a line b(N).

Figure 3:
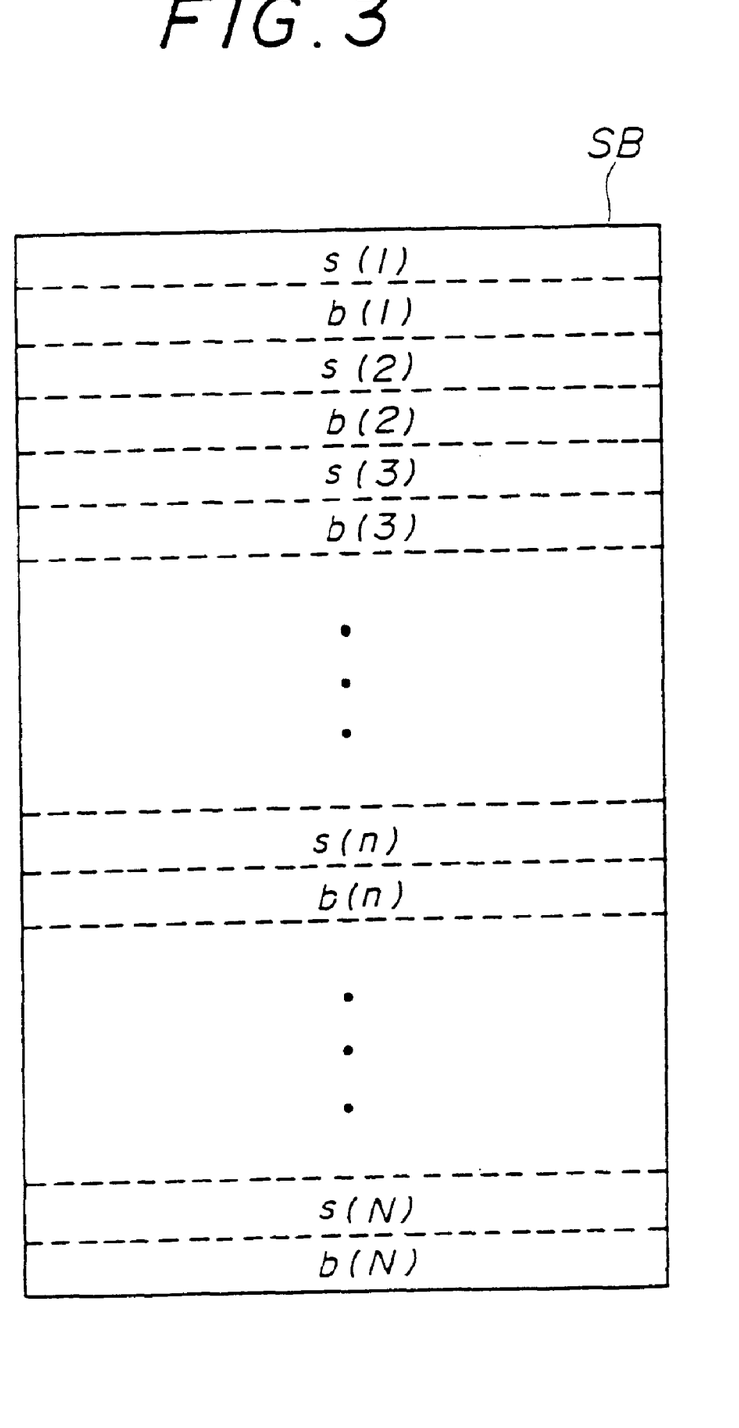
FIG. 3 is an illustration for explaining a structure of both-sides-synthesized image data.

The front-face image data S and the back-face image data B are input to a switching unit 5. The switching unit 5 is controlled by a control unit 6 so as to alternately output one of the front-face image data S and the back-face image data B. The image data output from the switching unit 5 is referred to as both-sides-synthesized image data SB. The both-sides-synthesized image data SB is image data in which the lines constituting the front-face image data S and the lines constituting the back-face image data B appears alternately as shown in FIG. 3.

The both-sides-synthesized image data SB output from the switching unit 5 is input to a current line memory 8a of a line memory 8. In the line memory 8, image data corresponding to a single pixel is shifted from the current line memory 8a to an immediately preceding line memory 8b when image data corresponding to a single pixel is input to the current line memory 8a. At the same time, image data corresponding to a single pixel is shifted from the immediately preceding line memory 8b to a second immediately preceding line memory 8c which is a line memory immediately preceding the immediately preceding line memory 8b. The line memory 8 buffers the both-sides-synthesized image data SB corresponding to three consecutive lines by repeating the above-mentioned operation. It should be noted that although the line memory 8 generally comprises a RAM, a FIFO memory may be used instead.

A template forming unit 10 refers to the current line memory 8a, the immediately preceding line memory 8b and the second immediately preceding line memory 8c of the line memory 8. Specifically, the template forming unit always refers to the current line memory 8a, and selectively refers to one of the immediately preceding line memory 8b and the second immediately preceding line memory 8c. The selection of one of the line memories 8b and 8c is performed in accordance with a designation of the control unit 6 as to whether a scanning of both sides is designated or a scanning of one side is designated.

The selection of the referenced line is performed by a switching control of a switching unit 9 in accordance with a designation of a both sides scanning or a one side scanning provided by the operational unit 7. It should be noted that FIG. 1 shows a state in which the both sides scanning is designated by the operational unit 7, and the switching unit 9 is switched so that the second immediately preceding line memory 8c is referred to by the template forming unit 10.

The template forming unit 10 refers to the line memory 8, and forms a template by selecting reference pixels "X" which are adjacent to and located in predetermined positions with respect to a current pixel "?" which is sequentially extracted from the current line as a pixel to be encoded. The template forming unit 10 outputs the thus-formed template to a compressing and encoding unit 11.

The compressing and encoding unit 11 encodes the both-sides-synthesized image data so as to output the encoded both-sides-synthesized image data to a transmitting unit 12. That is, the compressing and encoding unit 11 predicts a pixel value of the current pixel "?" included in the template by referring to the group of the reference pixels "X" in the template, and performs an arithmetic encoding on a result of prediction. The transmitting unit 12 transmits the both-sides-synthesized image data to a remote apparatus via a line 30.

Figure 4A:
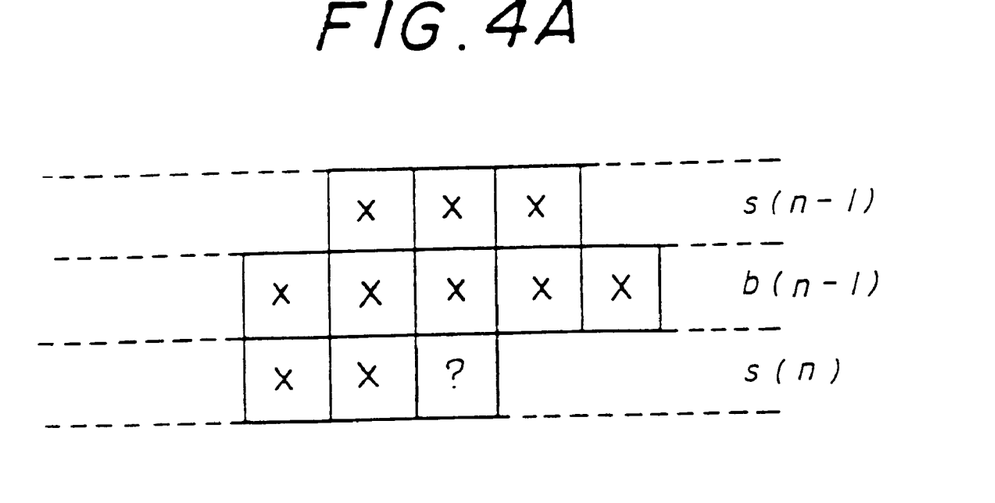
FIG. 4A is an illustration for explaining a template covering three lines.

FIG. 4A is an illustration of a typical template which is used when an arithmetic encoding such as the JBIG method is performed. In FIG. 4A, ten reference pixels "X" are selected or extracted from pixels included in the current line, the immediately preceding line and the second immediately preceding line.

If the above-mentioned both-sides-synthesized image data SB is input to the template forming unit 10 and the reference pixels are extracted as shown in FIG. 4A, the current line corresponds to line s(n) which comes from the front-face image data S, the immediately preceding line corresponds to line b(n−1) which comes from back-face image data B, and the second immediately preceding line corresponds to line s(n−1) which comes from the front-face image data S. Accordingly, the back-face image data B which does not have a correlation with the front-face image data S is referred to as the immediately preceding line when the current pixel extracted from the front-face image data S is processed. Thus, a compression ratio becomes lower than that of a case in which the immediately preceding line and the second immediately preceding line come from the front-face image data S. The same thing happens when the current line comes from the back-face image data B.

Figure 4B:
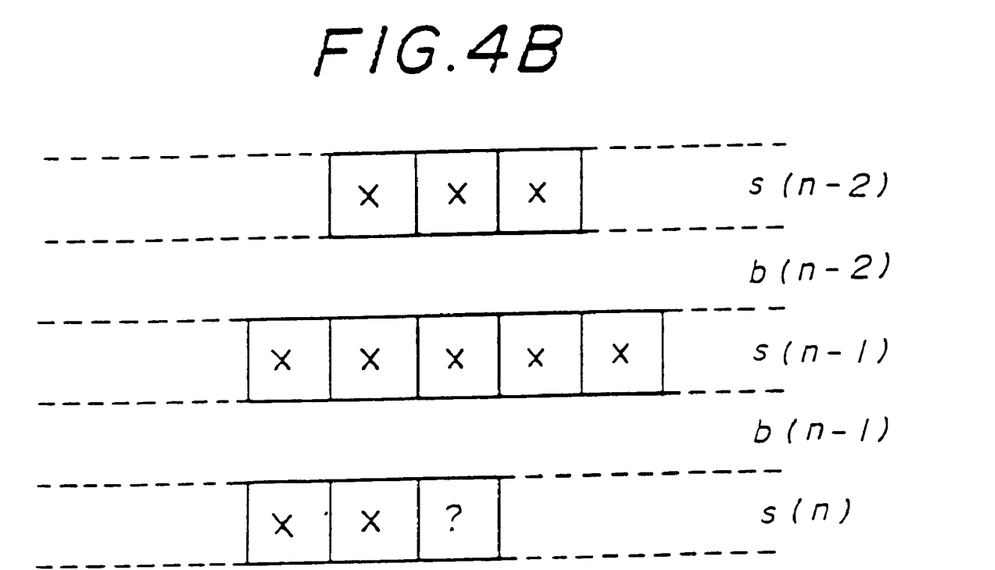
FIG. 4B is an illustration for explaining a template covering three lines with skipped lines therebetween.

Accordingly, as mentioned before, the inventor of the present application suggested a method in which the reference pixels "X" are extracted from pixels of every other line starting from the current line as shown in FIG. 4B. That is, when the current line s(n) comes from the front-face image data S, line s(n−1) and line s(n−2) are referred to, as shown in FIG. 4B, so that all lines which are referred to come from the front-face image data S. When the current line comes from the back face B, the reference pixels are extracted by a similar manner.

However, if such a method is used, five lines in total including the current line, two lines which come from the front-face image data S and two lines which come from the back-face image data B must be stored in a line memory.

On the other hand, a line memory used for an image scanning apparatus generally has a line memory having a capacity for storing three lines since a template covering three lines is used. However, an arithmetic encoding according to the JBIG encoding method can use a template covering two lines as shown in FIG. 5A instead of the template covering three lines.

Figure 5A:
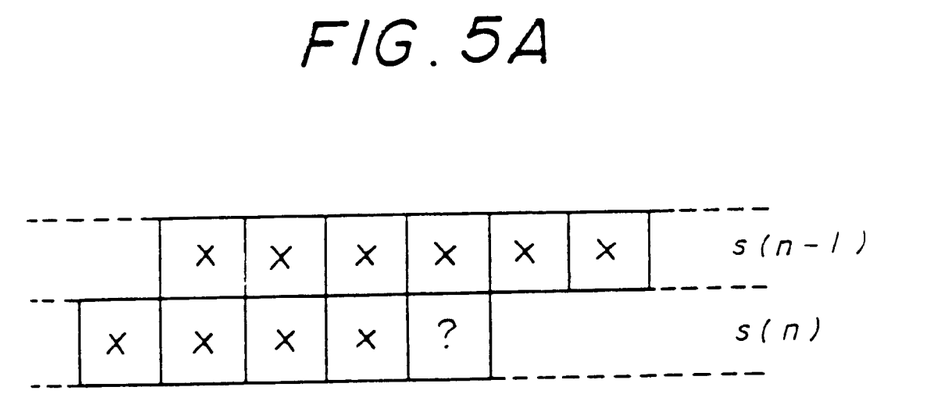
FIG. 5A is an illustration for explaining a template covering two lines.
Figure 5B:
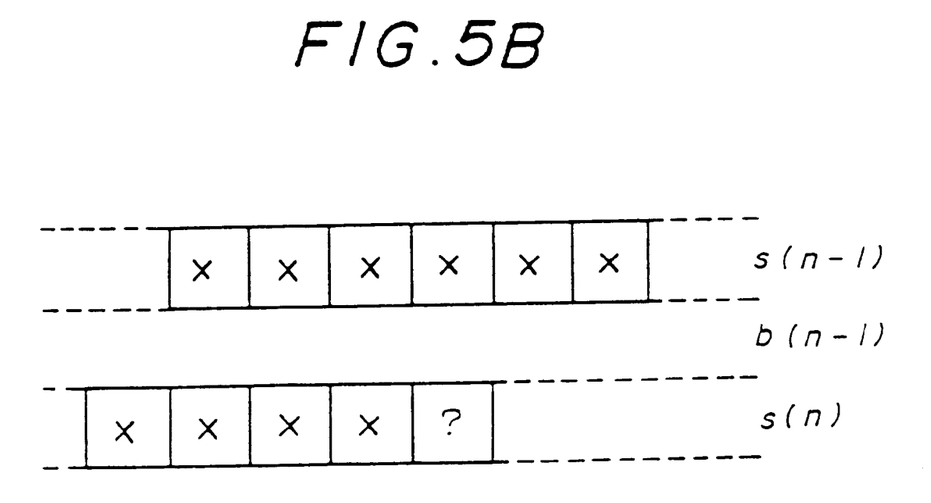
FIG. 5B is an illustration for explaining a template covering two lines with a skipped line therebetween.

FIG. 5A shows an illustration of an example of a template covering two lines. If the template shown in FIG. 5A is used, a number of lines which must be stored in a line memory for one side of the original sheet can be reduced from three lines to two lines. Thus, when the template covering two lines is used for processing the above mentioned both-sides-synthesized image data SB, the line memory storing three lines can be used. In such a case, the reference pixels "X" to be extracted for the current pixel "?" located in the current line S(n) which comes from the front-face image data S are located in the current line s(n) and the second immediately preceding line s(n−1), as shown in FIG. 5B, since the immediately preceding line b(n−1) comes from the back-face image data B. Accordingly, the template shown in FIG. 5A is changed so as to extract pixels from the second immediately preceding line as shown in FIG. 5B.

If the template is formed as shown in FIG. 5B, when the current pixel "X" included in the current line is encoded, the current line and the second immediately preceding line which comes from the same face as that of the current line can be referred to. If this method is used, a line memory having a capacity for storing three lines can be used, which line memory is generally used in the conventional image scanning apparatus.

In the image scanning apparatus 1 shown in FIG. 1, a template shown in FIG. 5B is virtually formed in the line memory 5. The virtually formed template corresponds to the template shown in FIG. 5A since the second immediately preceding line is virtually set as the immediately preceding line by the switching unit 9.

Accordingly, a compression ratio achieved for the both-sides-synthesized image data SB in the compressing and encoding unit 11 is substantially the same as that when the front-face image data S and the back-face image data B are individually obtained and are individually encoded by the template shown in FIG. 5A. Although the compression ratio is decreased by a few percent from a compression ratio obtained when the template covering three lines is used, the decrease in the compression ratio is not significant and an advantage of reduction in the number of line memories is more important.

As mentioned above, in the facsimile apparatus 1, the both-sides-synthesized image data SB can be efficiently encoded with a line memory having a small capacity. However, if the line memories referred to by the template forming unit 10 to form the template are fixed to the current line memory 8a and the second immediately preceding line memory 8c, there is a problem when only one side of the original sheet 2 is scanned. Specifically, if one of the front-face image data S and the back side image data B is input to the line memory 8 when a one-side scanning instruction is input through the operational unit 7, one of the front-face image data S and the back side image data B is input to the line memory 8 by the switching unit 5 being fixedly connected to one of the front-face scanner 3 and the back-face scanner 4. In such a case, since the image data input to the line memory 8 is not the both-sides-synthesized image data which includes the front-face image data S and the back-face image data B in the alternating relationship on a line-by-line basis, the template forming unit 10 must refer to the current line memory 8a and the immediately preceding line memory 8b.

Accordingly, in the present embodiment, the switching unit 9 is provided between the line memory 8 and the template forming unit 10 so that the switching unit 9 is switched to connect the template forming unit 10 to the line memory 8b when "one-side scan" is designated through the operational unit 7.

Thereby, the template forming unit 10 is able to refer to the current line memory 8a and the immediately preceding line memory 8b when the one-side scan is performed. Thus, in the template forming apparatus 10, the template to be used is not needed to be changed when the both-sides scan is switched to the one-sides scan or the one-side scan is switched to the both-side scan. This results in a reduction in a hardware scale. Additionally, the compressing and encoding unit 11 can perform the same encoding operation as that performed for the both-sides-synthesized image data SB irrespective of whether the both-sides scan or the one-side scan is performed since positions of the reference pixels are not changed between the both-sides scan and the one-side scan with respect to the compressing and encoding unit 11.

As mentioned above, the facsimile apparatus 1 arithmetically encodes the both-sides-synthesized image data SB, and outputs the encoded both-sides-synthesized image data. The encoded both-sides-synthesized image data output from the facsimile apparatus 1 can be appropriately expanded and decoded by a facsimile apparatus 20 shown in FIG. 6.

Figure 6:
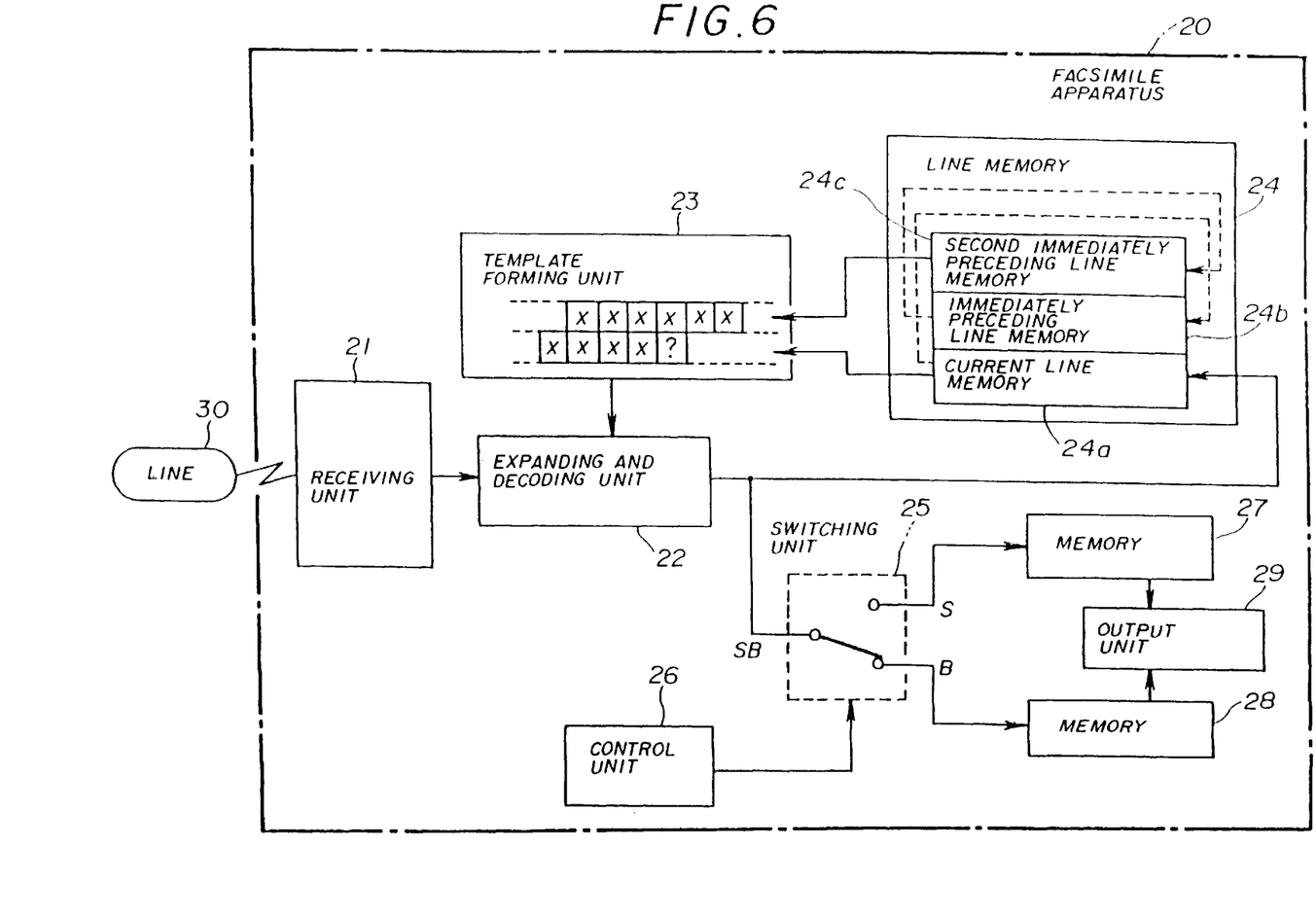
FIG. 6 is a block diagram of a facsimile apparatus which can decode image data transmitted from the facsimile apparatus shown in FIG. 1.

In FIG. 6, the encoded both-sides-synthesized image data transmitted by the facsimile apparatus 1 is received by a receiving unit 21 via the line 30, and is input to an expanding and decoding unit 22. The expanding and decoding unit 22 performs a decoding operation by predicting a pixel value of a current pixel "?" by using reference pixels "X" provided by a template forming unit 23 so as to output the both-sides-synthesized image data SB shown in FIG. 3 which is the image data before being subjected to the encoding.

The both-sides-synthesized image data SB output from the expanding and decoding unit 22 is input to a switching unit 25. The switching unit 25 is controlled by a control unit 26 so as to separately output the front-face image data S and the back-face image data B on an individual line basis. That is, the switching unit 25 separates the front-face image data S and the back-face image data B from each other as shown in FIGS. 2A and 2B.

The thus-separated front-face image data S is stored in a memory 27, and the thus-separated back-face image data is stored in a memory 28. Then, the front faced image data S and the back-face image data B are sequentially output as output image data by an output unit 29. A form of output of the output unit 29 may be a hard copy obtained by an electronic photographic method or an inkjet method, or a soft copy by a display apparatus. The output of the output unit 29 may be stored in an electronic filing system. Additionally, one of the front-face image data S and back-face image data B is directly output from the output unit 29 without being stored in the memory 27 or 28 while the other of the front-face image data S and the back-face image data B is stored in the memory 27 or 28. After completion of output of the one of the front-face image data S and the back-face image data B, the stored image data is read from the memory 27 or 28 and is output by the output unit 29.

The both-sides-synthesized image data SB output from the expanding and decoding unit 22 is input to a current line memory 24a of a line memory 24 as well as the switching unit 25. In the line memory 24, image data corresponding to a single pixel is shifted from the current line memory 24a to an immediately preceding line memory 24b when image data corresponding to a single pixel is input to the current line memory 24a. At the same time, image data corresponding to a single pixel is shifted from the immediately preceding line memory 24b to a second immediately preceding line memory 24c which is a line memory immediately preceding the immediately preceding line memory 24b. The line memory 24 buffers the both-sides-synthesized image data SB corresponding to three consecutive lines by repeating the above-mentioned operation. It should be noted that although the line memory 24 generally comprises a RAM, a FIFO memory may be used instead.

A template forming unit 23 refers to the current line memory 24a and the second immediately preceding line memory 24c of the line memory 24. The template forming unit 23 refers to the line memory 24, and forms a template covering two lines by selecting reference pixels "X" which are adjacent to and located in predetermined positions with respect to a current pixel "?" which is sequentially extracted from the current line as a pixel to be decoded. The template forming unit 23 outputs the thus-formed template to the expanding and decoding unit 22. The arrangement of the reference pixels "X" in the template is the same as that shown in FIG. 5B, which arrangement is used in the facsimile apparatus shown in FIG. 1.

Accordingly, the expanding and decoding unit 22 appropriately decodes the received both-sides-synthesized image data to restore the original both-sides-synthesized image data SB by decoding the current pixel to be encoded by referring to the reference pixels "X" extracted by the template forming unit 23. Additionally, the line memory 24 can be one having a capacity for storing three lines as is the same as the line memory 8 of the facsimile apparatus 1 shown in FIG. 1. This results in a reduction in a hardware scale.

Figure 7:
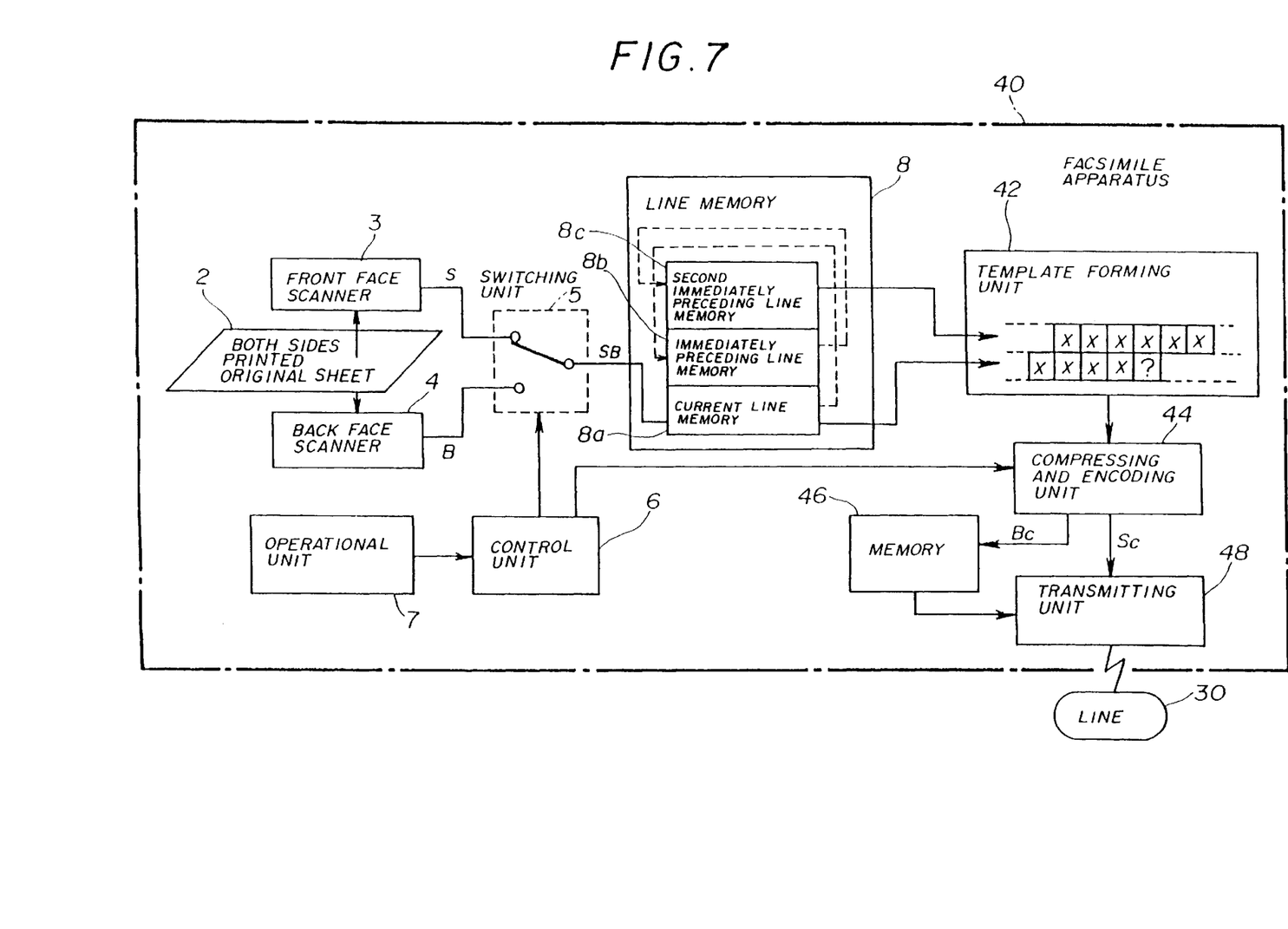
FIG. 7 is a block diagram of a facsimile apparatus according to a second embodiment of the present invention.

A description will now be given, with reference to FIGS. 7 to 9, of a second embodiment according to the present invention. FIG. 7 is a block diagram of a facsimile apparatus 40 according to the second embodiment of the present invention. In FIG. 7, parts that are the same as the parts shown in FIG. 1 are given the same reference numerals, and descriptions thereof will be omitted.

In the facsimile apparatus 40 shown in FIG. 7, both sides of the original sheet 2 are scanned by the front-face scanner 3 and the back-face scanner 4. The front-face image data S and the back-face image data B are synthesized and stored in the line memory 8 in the same manner as the first embodiment shown in FIG. 1.

A template forming unit 42 forms a template covering two lines by referring to the current line memory 8a and the second immediately preceding line memory 8c. The current pixel "?" to be encoded and the reference pixels "X" are provided to a compressing and encoding unit 44. The compressing and encoding unit 44 can encode the both-side synthesized image data SB to encoded data which can be decoded by a conventional encoder.

Figure 8:
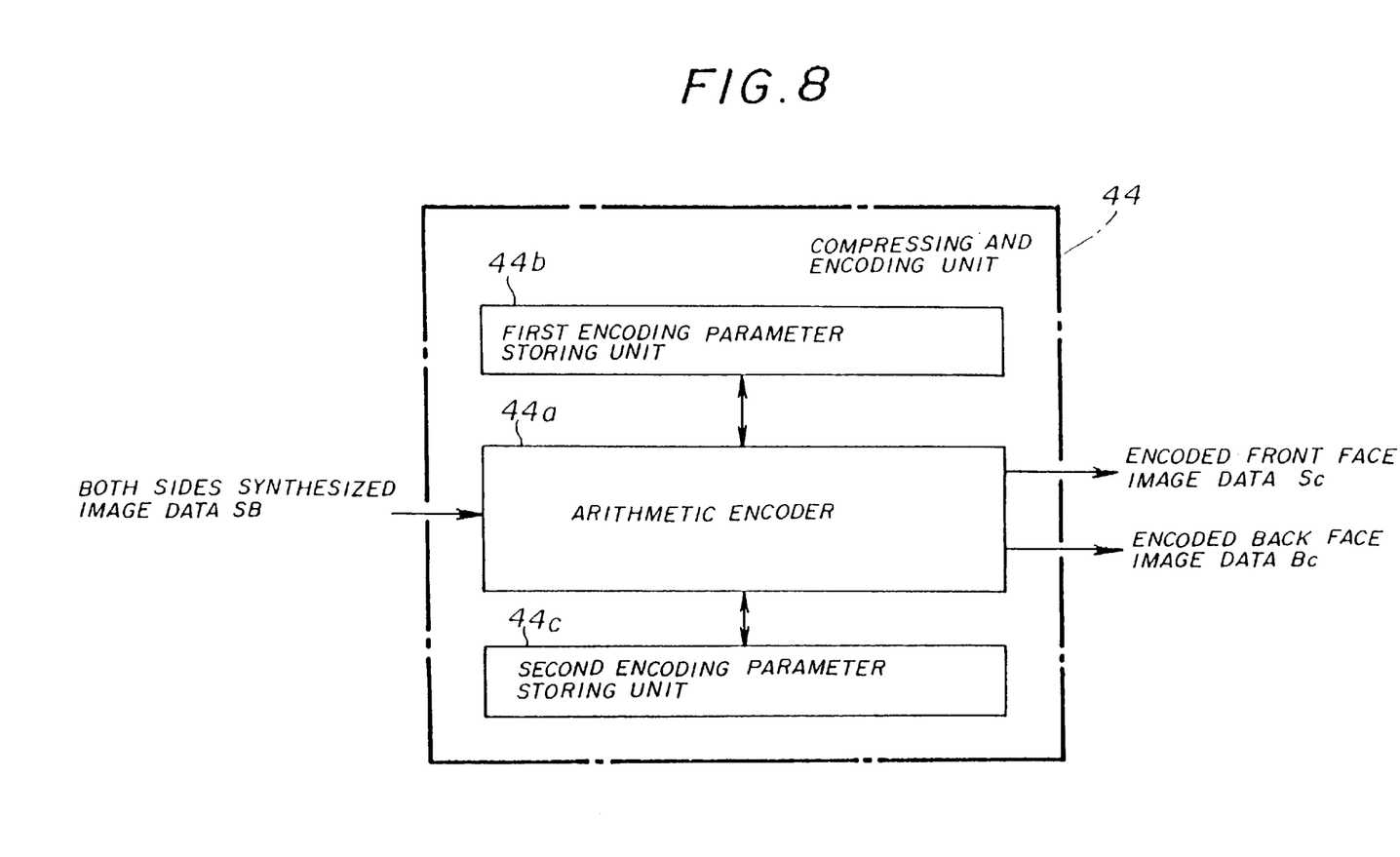
FIG. 8 is a block diagram of a compressing and encoding unit shown in FIG. 7.
Figure 9:
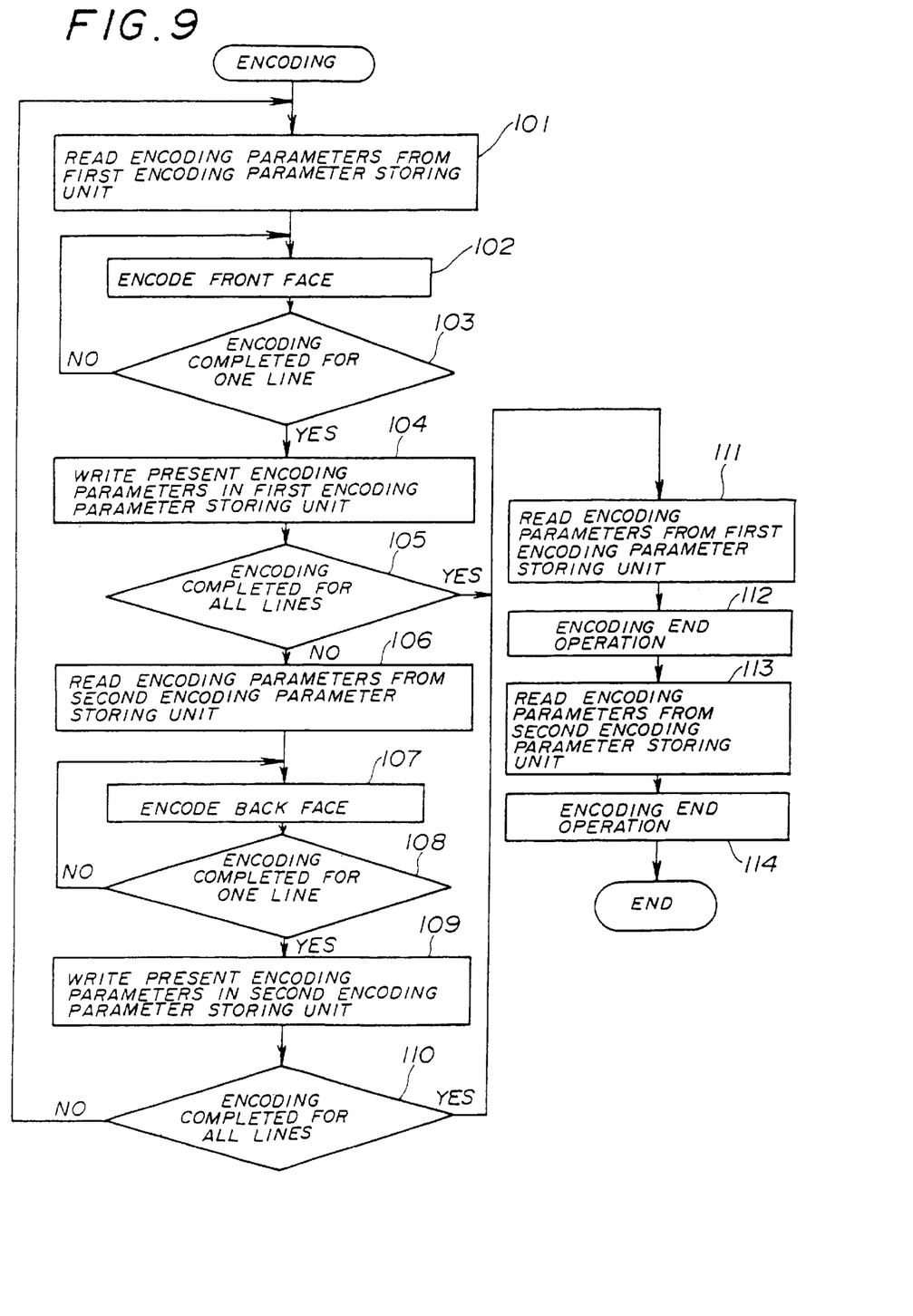
FIG. 9 is a flowchart of an operation performed by the compressing and encoding unit shown in FIG. 8.

FIG. 8 shows a block diagram of the compressing and encoding unit 44. As shown in FIG. 8, the compressing and encoding unit 44 comprises an arithmetic encoder 44a, a first encoding parameter storing unit 44b and a second encoding parameter storing unit 44c. The arithmetic encoder 44a arithmetically encodes the both-sides-synthesized image data SB, and outputs encoded front-face image data Sc and encoded back-face image data Bc. The first encoding parameter storing unit 44b and the second encoding parameter storing unit 44c are provided for temporarily storing encoding parameters used in the arithmetic encoder 44a.

The encoding parameters used in the arithmetic encoder 44a are parameters having various values during an encoding operation, such as an A register indicating an augend for encoding, a value of a C register performing code calculations and values of various counters. Additionally, a memory value for achieving a learning function in the arithmetic encoder 44a is included in the encoding parameters. The memory value corresponds to a state of reference pixels "X" which are arranged adjacent to a current pixel "?" to be encoded by the template forming unit 42. For example, if ten reference pixels are provided, the number of states is $2^{10}$= 1,024. The memory value is continuously undated as an encoding process progresses.

A description will now be given, with reference to FIG. 9, of an encoding operation performed by the arithmetic encoder 44a. FIG. 9 is a flowchart of the encoding operation of the arithmetic encoder 44a.

When the encoding operation for the both-sides-synthesized image data SB is started, the encoding parameters are read from the first encoding parameter storing unit 44b in step 101. The both-sides-synthesized image data SB includes lines of the front-face image data S and lines of the back-face image data B alternately on an individual line basis as shown in FIG. 3. Accordingly, in step 101, the encoding parameters for the front-face image data S are set in the arithmetic encoder 44a.

Thereafter, in step 102, an encoding operation is performed on the front-face image data S. It is then determined, in step 103, whether or not the front-face image data S corresponding to one line has been completed. If it is determined that the front-face image data S corresponding to one line has not been completed, the routine returns to step 102 to continue the encoding operation. If it is determined that the front-face image data S has been completed, the routine proceeds to step 104. In step 104, the encoding parameters at the present time are written in the first encoding parameter storing unit 44b. According to the process of steps 102 and 103, the front-face image data S corresponding to one line is encoded, and the encoded front-face image data Sc corresponding to one line is output from the arithmetic encoder 44a.

After the process of step 105 is completed, the routine proceeds to step 105. In step 105, it is determined whether or not all lines of the both-sides-synthesized image data SB have been encoded. If it is determined that all lines have not been encoded, the routine proceeds to step 106.

In step 106, the encoding parameters are read from the second encoding parameter storing unit 44c. The both-sides-synthesized image data SB includes lines of the front-face image data S and lines of the back-face image data B alternately on an individual line basis as shown in FIG. 3. Accordingly, in step 106, the encoding parameters for the back-face image data B are set in the arithmetic encoder 44*a*.

Thereafter, in step 107, an encoding operation is performed on the back-face image data B. It is then determined, in step 108, whether or not the back-face image data B corresponding to one line has been completed. If it is determined that the back-face image data B corresponding to one line has not been completed, the routine returns to step 107 to continue the encoding operation. If it is determined that the back-face image data B has been completed, the routine proceeds to step 109. In step 109, the encoding parameters at the present time are written in the second encoding parameter storing unit 44*c*. According to the process of steps 107 and 108, the back-face image data B corresponding to one line is encoded, and the encoded back-face image data Bc corresponding to one line is output from the arithmetic encoder 44*a*.

After the process of step 109 is completed, the routine proceeds to step 110. In step 110, it is determined whether or not all lines of the both-sides-synthesized image data SB have been encoded. If it is determined that all lines have not been encoded, the routine proceeds to step 101.

Accordingly, the process of steps 101 to 109 is repeated so that the encoded front-face image data Sc and the encoded back-face image data Bc are separately output from the arithmetic encoder 44*a* as if the front-face image data Sc obtained by the front-face scanner 3 is directly encoded without being synthesized with the back-face image data Bc, and as if the back-face image data Bc obtained by the back-face scanner 4 is directly encoded without being synthesized with the front-face image data Sc.

If it is determined, in step 105 or 110, that all lines of the both-sides-synthesized image data SB have been encoded, the routine proceeds to step 111. In step 111, the encoding parameters are read from the first encoding parameter storing unit 44*b*, and the routine proceeds to step 112. In step 112, an encoding end operation for the encoded front-face image data Sc is performed. Thereafter, in step 113, the encoding parameters are read from the second encoding parameter storing unit 44*c*, and the routine proceeds to step 114. In step 114, an encoding end operation for the encoded back-face image data Bc is performed.

As mentioned above, according to the compressing and encoding unit 44, the encoded front-face image data Sc and the encoded back-face image data Bc can be decoded and expanded by a conventional arithmetic encoder. In the present embodiment, the encoded front-face image data Sc is directly input to the transmitting unit 48, and is transmitted to a remote facsimile apparatus via the line 30. On the other hand, the encoded back-face image data Bc is temporarily stored in a memory 46, and is input to the transmitting unit 48 after the encoded front-face image data Sc has been transmitted.

It should be noted that although the present invention is applied to a facsimile apparatus as an image scanning apparatus in the above-mentioned embodiments, the present invention is not limited to a facsimile apparatus and is applicable to an image filing apparatus or a scanner apparatus. Additionally, although the present invention is applied to a facsimile apparatus as an image outputting apparatus in the above-mentioned embodiments, the present invention is not limited to a facsimile apparatus and is applicable to an image filing apparatus having an image displaying function.

Additionally, in the above-mentioned embodiments, although the line memory has a capacity for storing three lines, it can be appreciated that a line memory having a capacity for storing at least two lines plus three pixels can be used. The positions of the three pixels are dependent on the configuration of the template to be used.

The present invention is not limited to the specifically disclosed embodiments, and variations and modifications may be made without departing from the present invention.

The present application is based on Japanese priority application No. 9-224467 filed on Aug. 7, 1997, the entire contents of which are hereby incorporated by reference.

What is claimed is:

1. An image scanning apparatus for outputting encoded image data obtained by scanning a first face of an original sheet and a second face of said original sheet, said second face opposite to said first face, said image scanning apparatus comprising:

a first scanner scanning said first face of said original sheet on an individual line basis;

a second scanner scanning said second face of said original sheet on an individual line basis, a scanning operation of said first scanner and a scanning operation of said second scanner being performed substantially at the same time;

a both-sides synthesizing unit outputting both-sides-synthesized image data by alternately outputting image data of said first scanner and said second scanner on an individual line basis;

a line memory storing three consecutive lines of the both-sides-synthesized image data, the three lines including a current line, an immediately preceding line and a second immediately preceding line immediately preceding said immediately preceding line, said current line including a current pixel being encoded;

a template forming unit extracting reference pixels having a predetermined positional relationship with the current pixel, the reference pixels being extracted from among pixels included in said current line and said second immediately preceding line and not from said immediately preceding line of said line memory; and an encoder encoding a pixel value of the current pixel by using a result of prediction of the pixel value of the current pixel as a parameter for encoding, an encoding operation being performed in accordance with a predetermined arithmetic encoding method so as to output encoded both-sides-synthesized image data, a prediction of the pixel value of the current pixel being performed by referring to said reference pixels.

2. An image scanning apparatus for outputting encoded image data obtained by scanning at least one of a first face of an original sheet and a second face of said original sheet, said second face opposite to said first face, said image scanning apparatus comprising:

a first scanner scanning said first face of said original sheet on an individual line basis;

a second scanner scanning said second face of said original sheet on an individual line basis, a scanning operation of said first scanner and a scanning operation of said second scanner being performed substantially at the same time;

a both-sides synthesizing unit outputting both-sides-synthesized image data by alternately outputting image data of said first scanner and said second scanner on an individual line basis when both sides of said original sheet are scanned, said both-sides synthesizing unit outputting one-side image data by outputting image data which is output from one of said first scanner and said second scanner when only one side of said original sheet is scanned;

a line memory storing three consecutive lines of one of the both-sides-synthesized image data and the one-side image data, the three lines including a current line, an immediately preceding line and a second immediately preceding line immediately preceding said immediately preceding line, said current line including a current pixel being encoded;

a template forming unit extracting reference pixels having a predetermined positional relationship with the current pixel, the reference pixels being extracted from among pixels included in said current line and said second immediately preceding line and not from said immediately preceding line of said line memory when both sides of said original sheet are scanned, the reference pixels being extracted from among pixels included in said current line and said immediately preceding line of said line memory when only one side of said original sheet is scanned; and an encoder encoding a pixel value of the current pixel by using a result of prediction of the pixel value of the current pixel as a parameter for encoding, an encoding operation being performed in accordance with a predetermined arithmetic encoding method so as to output one of encoded both-sides-synthesized image data and encoded one-side image data, a prediction of the pixel value of the current pixel being performed by referring to the reference pixels.

3. An image scanning apparatus for outputting encoded image data obtained by scanning a first face of an original sheet and a second face of said original sheet, said second face opposite to said first face, said image scanning apparatus comprising:

a first scanner scanning said first face of said original sheet on an individual line basis;

a second scanner scanning said second face of said original sheet on an individual line basis, a scanning operation of said first scanner and a scanning operation of said second scanner being performed substantially at the same time;

a both-sides synthesizing unit outputting both-sides-synthesized image data by alternately outputting image data of said first scanner and said second scanner on an individual line basis;

a line memory storing three consecutive lines of the both-sides-synthesized image data, the three lines including a current line, an immediately preceding line and a second immediately preceding line immediately preceding said immediately preceding line, said current line including a current pixel being encoded;

a template forming unit extracting reference pixels having a predetermined positional relationship with the current pixel, the reference pixels being extracted from among pixels included in the current line and the second immediately preceding line and not from said immediately preceding line of said line memory; and an encoding unit encoding a pixel value of the current pixel by using a result of prediction of the pixel value of the current pixel as a parameter for encoding, an encoding operation being performed in accordance with a predetermined arithmetic encoding method, a prediction of the pixel value of the current pixel being performed by referring to said reference pixels, said encoding unit comprising:

a first encoding parameter storing unit storing first encoding parameters used for encoding the image data output from said first scanner, the first encoding parameters being updated each time an encoding operation for the current line corresponding to the first face of said original sheet is completed;

a second encoding parameter storing unit storing second encoding parameters used for encoding the image data output from said second scanner, the second encoding parameters being updated each time an encoding operation for the current line corresponding to the second face of said original sheet is completed; and an encoder encoding the pixel value of the current pixel in accordance with the first encoding parameters read from said first encoding parameter storing unit, when the current pixel being encoded is included in the image data output from said first scanner, so as to output encoded one-side image data corresponding to the first face of said original sheet, said encoder also encoding the pixel value of the current pixel in accordance with the second encoding parameters read from said second encoding parameter storing unit, when the current pixel being encoded is included in the image data output from said second scanner, so as to output encoded one-side image data corresponding to the second face of said original sheet.

4. An image data outputting apparatus outputting image data by decoding encoded image data obtained by scanning a first face and a second face of an original sheet, said first face being opposite to said second face, said image data outputting apparatus comprising:

a decoder decoding a current pixel in accordance with a predetermined arithmetic decoding method so as to output decoded image data as both-sides-synthesized image data on an individual line basis;

a side separating unit separating the both-sides-synthesized image data output from said decoder into first one-side image data corresponding to the first face of said original sheet and second one-side image data corresponding to the second face of said original sheet on an individual line basis;

an outputting unit separately outputting the first one-side image data and the second one-side image data;

a line memory storing three consecutive lines of the both-sides-synthesized image data output from said decoder, the three lines including a current line, an immediately preceding line and a second immediately preceding line immediately preceding said immediately preceding line, said current line including the current pixel being decoded; and a template forming unit extracting reference pixels having a predetermined positional relationship with the current pixel, the reference pixel being extracted from among pixels included in the current line and the second immediately preceding line and not from said immediately preceding line of said line memory, wherein said decoder outputs the both-sides-synthesized image data by predicting a pixel value of the current pixel by using the reference pixels and decoding a pixel value of the current pixel by using a predicted pixel value of the current pixel as a parameter for decoding in accordance with a predetermined decoding method.

5. An image scanning method for outputting encoded image data obtained by scanning a first face of an original sheet and a second face of said original sheet, said second face opposite to said first face, said image scanning method comprising:

a first scanner step for scanning the first face of the original sheet on an individual line basis;

a second scanner step for scanning the second face of the original sheet on an individual line basis, the first scanner step and the second scanner step being performed substantially at the same time;

a synthesizing step outputting both-sides-synthesized image data by alternately outputting image data of the first scanning step and the second scanning step on an individual line basis;

storing three consecutive lines of the both-sides synthesized image data, the three lines including a current line, an immediately preceding line and a second immediately preceding line immediately preceding said immediately preceding line, the current line including a current pixel being encoded;

a template forming step extracting reference pixels having a predetermined positional relationship with the current pixel, the reference pixels being extracted from among pixels included in the current line and the second immediately preceding line and not from the immediately preceding line; and an encoding step encoding a pixel value of the current pixel by using a result of prediction of the pixel value of the current pixel as a parameter for encoding, the encoding step being performed in accordance with a predetermined arithmetic encoding method so as to output encoded both-sides-synthesized image data, a prediction of the pixel value of the current pixel being performed by referring to the reference pixels.

6. An image scanning method for outputting encoded image data obtained by scanning at least one of a first face of an original sheet and a second face of the original sheet, the second face opposite to the first face, the image scanning method comprising:

a first scanning step scanning the first face of the original sheet on an individual line basis;

a second scanning step scanning the second face of the original sheet on an individual line basis, the first scanning step and the second scanning step being performed substantially at the same time;

a synthesizing step outputting both-sides-synthesized image data by alternately outputting image data of the first scanning step and the second scanning step on an individual line basis when both sides of the original sheet are scanned, the synthesizing step outputting one-side image data by outputting image data from one of the first scanning step and the second scanning step when only one side of the original sheet is scanned;

storing three consecutive lines of one of the both-sides-synthesized image data and the one-side image data, the three lines including a current line, an immediately preceding line and a second immediately preceding line immediately preceding said immediately preceding line, said current line including a current pixel being encoded;

a template forming step extracting reference pixels having a predetermined positional relationship with the current pixel, the reference pixels being extracted from among pixels included in the current line and the second immediately preceding line and not from the immediately preceding line when both sides of the original sheet are scanned, the reference pixels being extracted from among pixels included in the current line and the immediately preceding line when only one side of the original sheet is scanned; and an encoder step encoding a pixel value of the current pixel by using a result of prediction of the pixel value of the current pixel as a parameter for encoding, the encoding step being performed in accordance with a predetermined arithmetic encoding method so as to output one of encoded both-sides-synthesized image data and encoded one-side image data, a prediction of the pixel value of the current pixel being performed by referring to the reference pixels.

7. An image scanning method for outputting encoded image data obtained by scanning a first face of an original sheet and a second face of said original sheet, the second face opposite to the first face, said image scanning method comprising:

a first scanning step scanning the first face of the original sheet on an individual line basis;

a second scanning step scanning the second face of the original sheet on an individual line basis, the first scanning step and the second scanning step being performed substantially at the same time;

a synthesizing step outputting both-sides-synthesized image data by alternately outputting image data of the first scanning step and the second scanning step on an individual line basis;

storing three consecutive lines of the both-sides-synthesized image data, the three lines including a current line, an immediately preceding line and a second immediately preceding line immediately preceding the immediately preceding line, said current line including a current pixel being encoded;

a template forming step extracting reference pixels having a predetermined positional relationship with the current pixel, the reference pixels being extracted from among pixels included in the current line and the second immediately preceding line and not from the immediately preceding line; and an encoding step encoding a pixel value of the current pixel by using a result of prediction of the pixel value of the current pixel as a parameter for encoding, the encoding step being performed in accordance with a predetermined arithmetic encoding method, a prediction of the pixel value of the current pixel being performed by referring to the reference pixels, the encoding step further comprising:

a first encoding parameter storing step storing first encoding parameters used for encoding the image data output from the first scanning step, the first encoding parameters being updated each time an encoding operation for the current line corresponding to the first face of the original sheet is completed;

a second encoding parameter storing step storing second encoding parameters used for encoding the image data output from the second scanning step, the second encoding parameters being updated each time an encoding operation for the current line corresponding to the second face of the original sheet is completed; and encoding the pixel value of the current pixel in accordance with the first encoding parameters, when the current pixel being encoded is included in the image data output from the first scanning step, so as to output encoded one-side image data corresponding to the first face of the original sheet, and also encoding the pixel value of the current pixel in accordance with the second encoding parameters, when the current pixel being encoded is included in the image data output from the second scanning step, so as to output encoded one-side image data corresponding to the second face of the original sheet.

8. An image data outputting method outputting image data by decoding encoded image data obtained by scanning a first face and a second face of an original sheet, the first face being opposite to the second face, the image data outputting method comprising:

a decoder step decoding a current pixel in accordance with a predetermined arithmetic decoding method so as to output decoded image data as both-sides-synthesized image data on an individual line basis;

a side separating step separating the both-sides-synthesized image data output from the decoder step into first one-side image data corresponding to the first face of the original sheet and second one-side image data corresponding to the second face of the original sheet on an individual line basis;

an outputting step separately outputting the first one-side image data and the second one-side image data;

a storing step storing three consecutive lines of the both-sides-synthesized image data output from the decoder step, the three lines including a current line, an immediately preceding line and a second immediately preceding line immediately preceding the immediately preceding line, the current line including the current pixel being decoded; and a template forming step extracting reference pixels having a predetermined positional relationship with the current pixel, the reference pixel being extracted from among pixels included in the current line and the second immediately preceding line and not from the immediately preceding line, wherein the decoder step outputs the both-sides-synthesized image data by predicting a pixel value of the current pixel by using the reference pixels and decoding a pixel value of the current pixel by using a predicted pixel value of the current pixel as a parameter for decoding in accordance with a predetermined decoding method.

* * * * *